US007089376B2

(12) United States Patent
Dieffenderfer et al.

(10) Patent No.: US 7,089,376 B2
(45) Date of Patent: Aug. 8, 2006

(54) REDUCING SNOOP RESPONSE TIME FOR SNOOPERS WITHOUT COPIES OF REQUESTED DATA VIA SNOOP FILTERING

(75) Inventors: James N. Dieffenderfer, Apex, NC (US); Bernard C. Drerup, Austin, TX (US); Jaya P. Ganasan, Youngsville, NC (US); Richard G. Hofmann, Apex, NC (US); Thomas A. Sartorius, Raleigh, NC (US); Thomas P. Speier, Holly Springs, NC (US); Barry J. Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 10/442,485

(22) Filed: May 21, 2003

(65) Prior Publication Data

US 2004/0186964 A1   Sep. 23, 2004

Related U.S. Application Data

(63) Continuation-in-part of application No. 10/393,116, filed on Mar. 20, 2003.

(51) Int. Cl.
*G06F 12/00* (2006.01)

(52) U.S. Cl. .................. 711/146; 711/118; 711/119; 711/123; 711/141; 711/144; 711/145; 711/210; 711/2; 711/3; 710/3; 710/4

(58) Field of Classification Search .................. 711/2, 711/3, 146, 118, 123, 141, 210; 710/3, 4
See application file for complete search history.

(56) References Cited

U.S. PATENT DOCUMENTS

| 5,404,489 A | * | 4/1995 | Woods et al. ............... 711/152 |
| 5,548,733 A | | 8/1996 | Sarangdhar et al. ......... 395/286 |
| 5,551,001 A | * | 8/1996 | Cohen et al. ............... 711/122 |

(Continued)

OTHER PUBLICATIONS

Moshovos (JETTY: filtering snoops for reduced energy consumption in SMP servers; High-Performane Computer Architecture, 2001. HPCA. The Seventh International Symposium on Jan. 19-24, 2001; pp. 85-96).*

(Continued)

*Primary Examiner*—Mano Padmanabhan
*Assistant Examiner*—Mardochee Chery
(74) *Attorney, Agent, or Firm*—Joscelyn G. Cockburn; Dillon & Yudell LLP

(57) ABSTRACT

In a system having a plurality of snooping masters coupled to a Bus Macro, a snoop filtering device and method are provided in at least one of the plurality of snooping masters. The snoop filtering device and method parse a snoop request issued by one of the plurality of snooping masters and return an Immediate Response if parsing indicates the requested data cannot possibly be contained in a responding snooping master. If parsing indicates otherwise the at least one plurality of snoop masters searches its resources and returns the requested data if marked updated.

13 Claims, 3 Drawing Sheets

U.S. PATENT DOCUMENTS

| | | |
|---|---|---|
| 5,659,710 A | 8/1997 | Sherman et al. ............. 395/473 |
| 5,784,579 A | 7/1998 | Pawlowski et al. .......... 395/286 |
| 5,878,268 A | 3/1999 | Hagersten ............... 295/800.28 |
| 5,890,217 A | 3/1999 | Kabemoto et al. ........... 711/141 |
| 5,948,088 A | 9/1999 | Sarangdhar et al. ......... 710/106 |
| 6,009,477 A | 12/1999 | Sarangdhar et al. ............ 710/1 |
| 6,023,747 A | 2/2000 | Dodson ....................... 711/141 |
| 6,065,077 A * | 5/2000 | Fu .............................. 710/100 |
| 6,336,169 B1 | 1/2002 | Arimilli et al. .............. 711/144 |
| 6,467,012 B1 | 10/2002 | Alvarez et al. ............. 710/316 |

OTHER PUBLICATIONS

"Measuring Memory Hierarchy Performance of Cache-Coherent Multiprocessors Using Micro Benchmarks", Hristea et al, 1997 ACM Digital Library.

* cited by examiner

Snoop Request Format

| Address | Type | Size | Attributes | MasterID |
|---------|------|------|------------|----------|

FIGURE 3

REDUCING SNOOP RESPONSE TIME FOR SNOOPERS WITHOUT COPIES OF REQUESTED DATA VIA SNOOP FILTERING

CROSS REFERENCE TO RELATED PATENT APPLICATIONS

The present invention is a Continuation-In-Part of U.S. patent application Ser. No. 10/393,116 filed Mar. 20, 2003, entitled "Targeted Snooping" by James N. Dieffenderfer, et al., assigned to the assignee of the present invention and incorporated herein by reference.

FIELD OF THE INVENTION

This invention relates generally to cache memory snooping and, more particularly, to an improved technique for snooping hardware enforced cache coherency when at least one master on a bus has a cache and shares data within an address range with other masters.

BACKGROUND OF THE INVENTION

In a system wherein there are multiple devices that share a common main memory, and each device can individually cache data from addresses in main memory, to ensure data consistency among devices, a mechanism often used is known as hardware enforced cache coherency of data. A portion of this mechanism is known as "snooping". When a processor, or other snooping master, makes a coherent access to main memory, that access is first broadcast to all the other snooping masters (the "non-originating snooping masters") as a "snoop request" by a central resource, called the "Bus Macro". The non-originating snooping masters react to the snoop request by returning a snoop result that indicates the state of that master's cache for the address provided with the snoop request. The bus macro receives all the snoop results and takes one of several possible actions based on the values of the snoop results. One action may be to allow the main memory access to complete. Another action may be to delay the main memory access until the non-originating snooping masters write modified data from their caches back to main memory. Other actions are also possible. Note that the most common type of snooping master with a cache is a processor, although other devices, such as DMA controllers, can be used.

Typically, when memory coherence is required, all snooping masters continuously snoop all main memory accesses to ensure data consistency. However, there are often times when a non-originating master knows that it cannot contain the data for a particular snoop request. In these cases, it is desirable for the non-originating master to not snoop its resources. This is desirable for several reasons:

1) Unnecessary power is consumed by the non-originating snooping masters that cannot contain the requested data checking their resources.

2) Once the request is made to the non-originating snooping master, that snooping master must snoop its cache to see if it has a cached copy of the requested address location. This snooping of the cache may interfere with the non-originating snooping master from accessing the cache locally, thus decreasing the performance of the non-originating snooping master.

3) If one of the non-originating snooping masters takes many clock cycles to snoop its cache the originating master will be stalled until the slowest non-originating snooping master has completed the snoop, thus decreasing the originating master's performance.

SUMMARY OF THE INVENTION

According to the present invention, a method of and structure for snooping the cache memories of a plurality of snooping masters connected to a bus macro having snooping logic is provided. Each of the snooping masters has a cache memory and the cache memories of some, but less than all, of the snooping masters may have the data requested by an originating snooping master and, in the disclosed protocol, the needed data in only one non-originating snooping master is marked as updated. A main memory having addresses for all data is connected to the bus macro.

An originating snooping master through the bus macro queries some or all of the non-originating snooping masters which may have the requested data. All the non-originating snooping masters that have been queried reply through the bus macro to the originating snooping master. If a non-originating snooping master knows that it cannot have the requested data, it immediately responds to the bus macro as not having the requested data without checking its resources. If a non-originating snooping master has the requested data marked as updated, that non-originating snooping master returns the updated data to the originating snooping master and possibly to the main memory through said bus macro. If none of the non-originating snooping masters have the requested data marked as updated, then the requested data is read from main memory by the bus macro, and then sent to the originating master.

DESCRIPTION OF THE DRAWINGS

FIG. 3 is block diagram representation of the fields within a snoop request message according to one embodiment of the invention.

DESCRIPTION OF THE PREFERRED EMBODIMENT(S)

Figure 1:
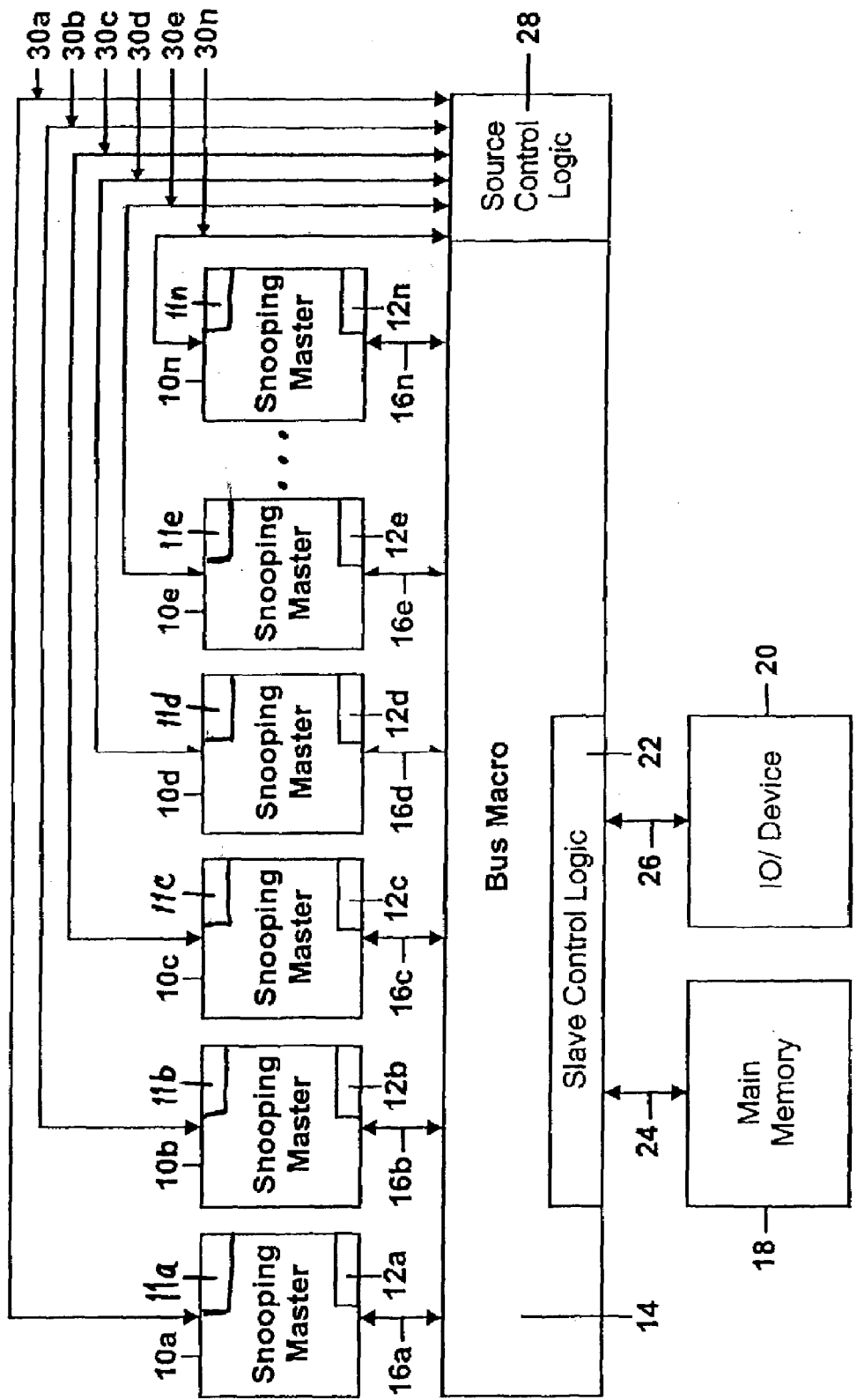
FIG. 1 is a high level diagram of a plurality of snooping masters and slave devices connected to a bus macro.

Referring now to the drawings, and for the present to FIG. 1, a high level block diagram of several snooping masters and several slave devices connected to a bus macro is shown. As illustrated in FIG. 1, a plurality of snooping masters or bus masters 10a, 10b, 10c, 10d, 10e . . . 10n are shown. As indicated above, the snooping masters 10a . . . 10n normally include processors, but they also may include certain other types of bus masters. It is required that the snooping masters that are to be snooped have cache memories 12a . . . 12n and be connected to bus macro 14 through connections 16a . . . 16n. According to the teachings of the present invention snoop filtering device 11a–11n are provided in each snooping master 10a–10n. The function of the snoop filtering device is to parse a snoop request and return a response without searching its resources if it knows it does not have the requested information. This type of response is termed "Immediate Response". (The bus macro 14 will sometimes be referred to simply as bus 14). Although not shown, some masters may share a connection. Also shown are two slave devices in the form of main memory 18 and an I/O device 20. It is to be understood that more slave devices could be present. The main memory 18 and I/O device 20 are connected to slave control logic 22 on bus 14 through connections 24 and 26, respectively. The main memory 18 contains all the address locations that any master 10a ... 10n may need. The snooping masters 10a ... 10n are connected to snoop control logic 28 on bus 14 through connections 30a ... 30n, respectively.

Figure 2:
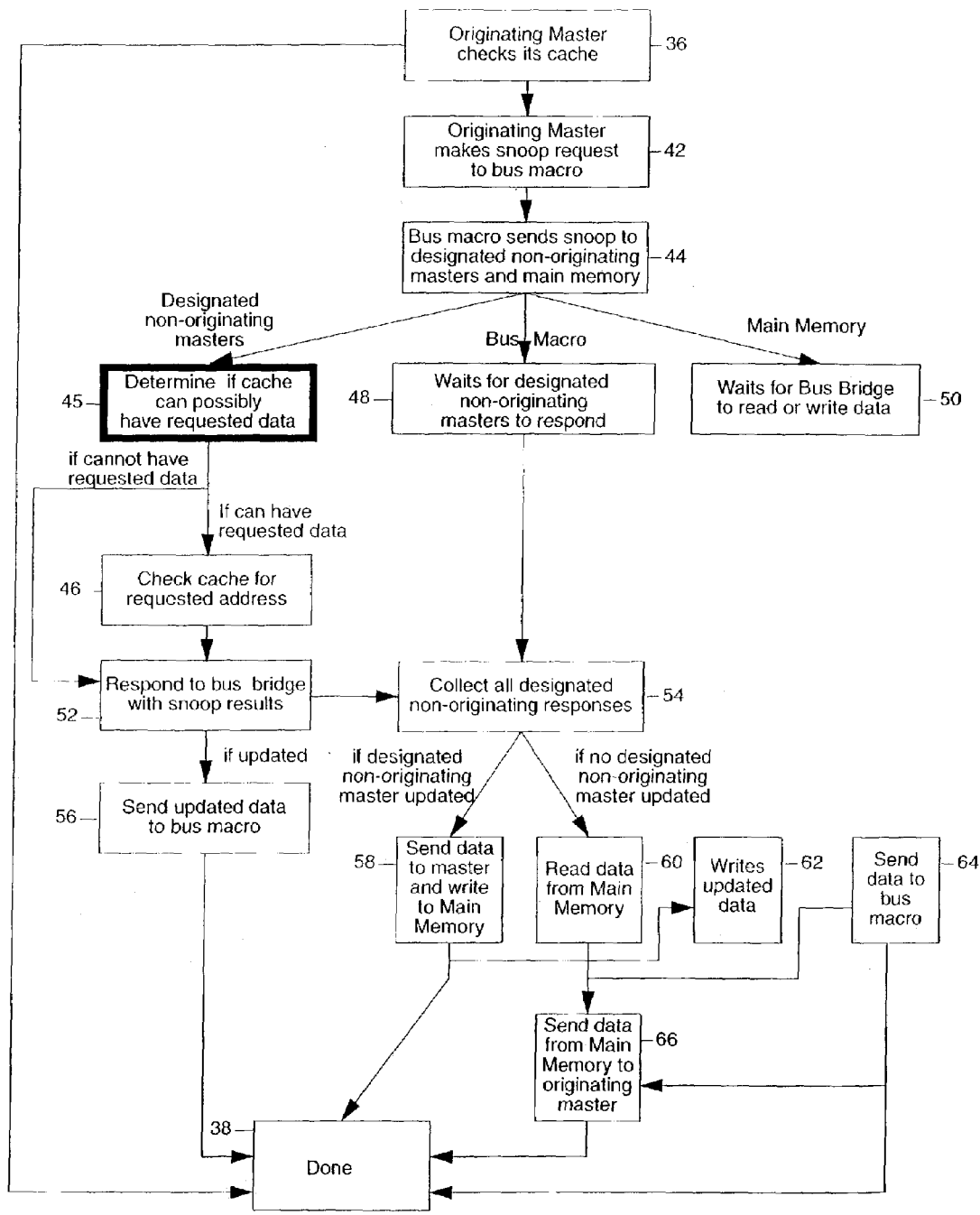
FIG. 2 is a flow diagram of the fulfillment of a snoop request that maybe used in the invention.

Referring now to FIG. 2, the operation of the present invention where a snooping master requires updated data is shown as a flow diagram. (In FIG. 2, those steps that are unique to this invention have the boxes in heavier outline, and those steps that are common to the above referenced application are in normal outline in the boxes.) The term "snooping", as used herein, means a bus master which can query the cache memories of the non-originating bus masters for the data that the originating bus master needs and, if any of the non-originating bus masters 10a ... 10n has such data which is updated, then the updated data is returned either directly or through main memory 18 (FIG. 1) to the originating bus master. There are many protocols that can use snooping, including but not limited to Modified Exclusive Shared Invalid (MESI), Modified Exclusive Invalid (MEI), Modified Exclusive Recent Shared Invalid (MERSI), and Modified Owned Shared Invalid (MOSI). The present invention will be described as it is implemented in MESI; however, it is to be understood that this invention is applicable to other protocols as well.

According to MESI, the protocol used in this scheme, only one master may have the data marked as updated (designated by the Modified state). If no updated data is found in any of the non-originating snooping masters' cache memories, the requested data is read from main memory 18 and written to the originating master.

As can be seen in FIG. 2, the first step 36 is for the originating master 10a to check its own cache memory 12a to see if data is there and marked with the desired state. The desired state for a write operation is Modified or Exclusive. The desired state for a read operation is Modified, Exclusive, or Shared. (In this illustration, master 10a is assumed to be the originating master, and the master 10b ... 10n are assumed to be the non-originating snooping masters and master 10b is assumed to be the non-originating snooping master with snoop filtering; however, any master 10a ... 10n can be the originating master, and all the other masters 10 are then the non-originating snooping masters.) If at step 36 the originating master 10a finds the desired data in its own cache memory 12a in the desired state, then no snoop query is generated, the data found in cache memory 12a is used by master 10a and the process is done as shown in step 38. If, however, cache memory 12a does not have the data in the desired state, then a snoop request is generated. This snoop request can be made to some or all of the non-originating snooping masters. The originating master 10a then conveys the snoop request to the bus 14, as shown in step 42. The bus 14 under the control of snooping logic 28 sends the snooping query to all designated non-originating snooping masters 10 as shown in step 44.

According to the present invention, non-originating master 10b only checks its resources for the requested data if it knows that it can possibly contain the requested data.

This non-originating snooping master has some system knowledge, such as snoop filtering device 11b, that allows it to filter these snoops without checking its resources. This is referred to as snoop filtering. This has three beneficial effects over the technique set forth in the referenced application of non-originating snooping master 10b always checking its resources, as follows:

1) power is saved by master 10b not checking its resources when it knows that it cannot have the requested data;

2) master 10b is not delayed from performing the task in which it might be engaged when a query is received when it knows that it cannot have the requested data; and 3) extra clock cycles are not unnecessarily incurred by the originating master while waiting for snoop responses from long latency masters when the non-originating masters know that they cannot have the requested data.

In order to accomplish this snoop filtering, the non-originating master 10b must have knowledge of whether it could share the requested data with the originating master 10a. There are a variety of techniques and/or snoop filtering device by which the non-originating master 10b could determine whether it could potentially share the requested data with the originating master 10a. One such technique involves a program resident in each master 10a ... 10n which "knows" what tasks each master 10a ... 10n is performing and has performed. This can be a simple as "knowing" that certain masters 10a ... 10n would not have data in the requested address range; or it could be more complex. From this information, the non-originating master 10b can know that it does not need to snoop its resources for the data requested by master 10a. The knowledge may be represented in different ways. One mechanism or device is a simple one bit flag in a register contained within non-originating master 10b for each originating master 10a ... 10n, wherein a "1" indicates that that specific master 10 could possibly share data with master 10b, and a "0" indicates this specific master 10 could not possibly share data with 10a ... 10n. When the non-originating master 10b receives the snoop request from bus 14 it will also receive a signal indicating which master 10a ... 10n originated the request. Master 10b then checks the flag associated with master 10a to see if it could be sharing the requested data with master 10a. If master 10b determines in step 45 that it cannot be sharing the requested data with master 10a it will not check its resources for the requested data and will immediately respond to bus 14 indicating that it does not have the requested data as shown in step 52. If master 10b determines that it could be sharing the requested data with master 10a in step 45, then master 10b will check all of its resources for the requested data as shown in step 46 and respond to bus 14 indicating the results of the snoop as shown in step 52. From this point on, the operation of the snooping is similar to the above referenced application as dictated by the particular protocol.

Each designated, non-originating master 10 responds to the bus 14 with its snoop results as to whether it has or does not have updated data as shown in step 52, and the bus 14 collects these results as shown in step 54. If one of the designated, non-originating masters 10 has updated data (it will be remembered that only one master 10a . . . 10n can have updated data so marked in this protocol), the updated data is sent to the bus 14 as shown in step 56. If updated data is sent to the bus 14, this updated data is sent by the bus 14 to the originating master 10a and to main memory 18 as shown in step 58, the data in cache 12a of the originating master 10a conditionally being marked as updated and the main memory being written as shown in step 62. (It is to be understood that in some protocols the updated data may be sent only to the originating master 10a or only to the main memory 18, or it may be sent indirectly to the originating master 10a through the main memory 18 and read therefrom.) If none of the responses from the designated non-originating masters 10 indicate that cache memories 12 contain data marked as updated in step 54, then data is read from the proper address in main memory 18 as shown in step 60 and sent to the bus 14 as shown in step 64, which sends the data from the main memory 18 to the originating master as shown in step 66 in this protocol. At this point, the snooping is completed.

FIG. 3 shows a graphical representation of the Snoop Request Message which includes the following fields: Address, Type, Size, Attributes and Master Identification (ID). The definitions and use for the names fields are Address: This is the address of the snoop request. This could be used by the non-originating snooper to filter the snoop.

Type: This is the type of the request that generated the snoop (read, write, cache op, synchronization op, etc). This could also be used by the non-originating master to filter the snoop.

Size: This is the amount of data requested.

Attributes: These are various request qualifiers that are passed along with the request. This could also be used by the non-originating master to filter the snoop.

Master ID: This is the ID of the originating master. This could also be used by the non-originating master to filter the snoop.

While the invention has been described in combination with specific embodiments thereof, there are many alternatives, modifications, and variations that are likewise deemed to be within the scope thereof. Accordingly, the invention is intended to embrace all such alternatives, modifications and variations as fall within the spirit and scope of the appended claims.

What is claimed is:

1. A system comprising:
   a bus macro;
   a plurality of snooping masters operable coupled to the bus macro;
   a memory operable positioned in each of said plurality of snooping masters;
   logic located in each snooping masters, said logic being operable to generate in at least one of said snooping masters a snoop request which is sent through the bus to non-originating snooping masters;
   a snoop filtering device, operable positioned in at least one of the non-originating snooping masters, to determine if data associated with the received snoop request could ever be in the at least one of the non-originating snooping masters without initiating a search of the memory associated with the at least one of the non-originating snooping masters; and
   said at least one of the snooping masters returning an Immediate Response to the originating snooping masters without searching any of the resources of the at least one of the non-originating snooping masters if the snoop filtering device indicates data associated with the snoop request is not in said at least one of the non-originating snooping masters.

2. The system of claim 1 further including the at least one of the snooping masters searching its resources, if the snoop filtering device indicates otherwise; and
   returning the data to the requesting snooping master if the at least one of the snooping masters has the data marked updated.

3. The system of claim 1 wherein the Bus Macro further includes source control logic and a slave control logic interface.

4. The system of claim 3 further including a main memory operatively coupled to the slave control logic interface; and I/O device operatively coupled to the slave logic interface.

5. The system of claim 1 wherein the snooping masters include at least one processor.

6. The system of claim 5 wherein;
   the snoop filtering device includes a register with at least one bit associated with a predefined snooping master and designated to be used as a flag to indicate likelihood of data requested by said predefined snooping master is in said at least one of the snooping masters; and
   wherein a setting of the flag bit to logical "0" causes the at least one snooping masters to return to a requester an Immediate Response of not having requested data without searching its resources.

7. The system of claim 6 wherein a setting of the flag bit to a logical "1" indicates likelihood that requested data is in said at least one snooping master, causes said at least one snooping masters to search its resources and forward the requested data if present in it and marked updated.

8. The system of claim 5 wherein the filtering device includes a storage in which an address range is written, said address range indicating addresses over which said at least one snooping masters can store data, and a program to correlate stored address range with address in a snooping request and issuing a response of not having requested data if the address in the snooping request falls outside of the address range.

9. A snooping master comprising:
   a memory; and
   a snoop filtering device that responsive to receiving a snoop request from another device enables said snooping master to issue a "not having requested data" response without searching said memory when said snoop filtering device dynamically determines, without accessing the memory, that data requested by said snoop request is not present in said memory;
   wherein said snooping master searches said memory for requested data if said snoop filtering device indicates otherwise; and
   wherein said snooping master forwards data if requested data is found in the memory and marked updated.

10. A method for snooping memories of snooping masters coupled to a Bus Macro including acts of:

receiving a snoop request in at least one of said snooping masters designed with a snoop filtering device;

examining said snoop request with the filtering device provided in one or more of said at least one of said snooping masters to determine whether the address of the snoop request is one which would not be present within memory resources associated with a specific snooping master;

generating a response indicating to the originator of the snoop request that the memory resources of the specific snooping master does not have requested data, wherein said response is generated without searching the associated memory resources of said specific snooping master, if examination of said snoop request indicates requested data could not possibly be contained in said memory resources of said specific snooping master; and if examination of said snoop request indicates otherwise, searching resources within said at least one of said snooping master; and forwarding requested data if found and marked updated.

11. The method of claim 10 further including acts of:

generating the snoop request in another one of said snooping masters; and transmitting said snoop request on a bus interconnecting said another one of said snooping masters and the at least one of said snooping masters.

12. A program product including a medium on which a computer program is recorded, said computer program including:

a first set of instructions for searching a memory;

a second set of instructions that correlates an address in a received snoop request with a predefined address range associated with a specific memory resource and issues signals indicating relationship of the address in the received snoop request and the address range;

a third set of instructions that, responsive to the signal; generate a response indicating that requested data is not present without searching said memory if the signals indicate the address of the received snoop request is not within the address range; and a fourth set of instructions responsive to the signals to cause said first set of instructions to search the memory if the snoop address falls within the address range and to forward the requested data if found and marked updated.

13. A program product including a medium on which a computer program is recorded, said computer program including:

a first set of instructions for searching a memory;

a second set of instructions that correlates selected characteristics in a received snoop request with predefined characteristics of a snooping master that receives the snoop request and issues signals indicating relationship of the selected characteristics and the predefined characteristic;

a third set of instructions responsive to the signals to generate a response indicating that the requested data is not present without searching said memory if the signals indicate the selected characteristics are not related; and program logic for initiating said first set of instructions when the signals indicate the selected characteristics are related and initiating said third set of instructions only when said signal indicate the selected characteristics are not related.

* * * * *